(12) United States Patent
Birk et al.

(10) Patent No.: US 9,530,294 B2
(45) Date of Patent: Dec. 27, 2016

(54) METHODS AND APPARATUS FOR PAIRING ITEMS FOR SECURITY

(71) Applicant: Intel Corporation, Santa Clara, CA (US)

(72) Inventors: Eran Birk, Haifa (IL); Omer Ben-Shalom, Rishon le-Tzion (IL); Yosi Govezensky, Nofit (IL); Yoram Hassidim, Modiin (IL)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 14/354,486

(22) PCT Filed: Dec. 23, 2013

(86) PCT No.: PCT/US2013/077629
§ 371 (c)(1),
(2) Date: Apr. 25, 2014

(87) PCT Pub. No.: WO2015/099693
PCT Pub. Date: Jul. 2, 2015

(65) Prior Publication Data
US 2015/0179033 A1    Jun. 25, 2015

(51) Int. Cl.
*G08B 23/00* (2006.01)
*G08B 13/14* (2006.01)
*G08B 21/02* (2006.01)

(52) U.S. Cl.
CPC ....... *G08B 13/1427* (2013.01); *G08B 21/0261* (2013.01); *G08B 21/0269* (2013.01); *G08B 21/0277* (2013.01)

(58) Field of Classification Search
None
See application file for complete search history.

(56) References Cited

U.S. PATENT DOCUMENTS

2006/0284982 A1    12/2006  Bigioi et al.
2010/0053462 A1*    3/2010  Candelore ............ H04N 5/4403
                                                      348/734

(Continued)

FOREIGN PATENT DOCUMENTS

KR    10-2010-0049135 A    5/2010
KR         10-1246990 B1    3/2013

OTHER PUBLICATIONS

International Search Report and Written Opinion received for PCT Patent Application No. PCT/US2013/077629, mailed on Sep. 24, 2014, 19 pages.
International Preliminary Report on Patentability and Written Opinion Received for PCT Patent Application No. PCT/US2013/077629, mailed on Jul. 7, 2016, 11 pages.
Crazy Engineers, "Wirless Mesh Networks", retrieved on Nov. 4, 2013, pp. 1-8. Available at http://www.crazyengineers.com/threads/wirless-mesh-netwodcs.28825/.

(Continued)

*Primary Examiner* — Ojiako Nwugo
(74) *Attorney, Agent, or Firm* — Barre Law Firm, PLLC (57) ABSTRACT

An item of value comprises an assembly of parts. The parts comprise a component that has value independent of the item, and an assembly security system that is operable to communicate with a central security system via a wide area network. The component comprises a component security system that is operable to communicate with the assembly security system. The assembly security system is operable to perform operations comprising (a) saving component data that identifies the component as part of the item; (b) after saving the component data, monitoring the component, via the component security system, to automatically determine whether the component has left a predetermined zone of proximity, relative to the item; and (c) in response to determining that the component has left the predetermined zone of proximity, automatically notifying the central security system that the component has left the predetermined zone of proximity. Other embodiments are described and claimed.

24 Claims, 4 Drawing Sheets

(56) References Cited

U.S. PATENT DOCUMENTS

| | | | |
|---|---|---|---|
| 2010/0167646 A1* | 7/2010 | Alameh | G06F 3/017 455/41.2 |
| 2010/0217719 A1* | 8/2010 | Olsen | B26D 5/00 705/318 |
| 2012/0088523 A1 | 4/2012 | Shirakawa et al. | |
| 2013/0196612 A1 | 8/2013 | Cepuran et al. | |
| 2014/0007264 A1* | 1/2014 | Berger | G06K 17/00 726/34 |
| 2014/0020123 A1* | 1/2014 | Berger | G06F 21/88 726/35 |
| 2014/0107579 A1* | 4/2014 | Lanigan | G01F 13/00 604/151 |
| 2014/0145847 A1* | 5/2014 | Jenkins | G08B 13/1427 340/572.1 |
| 2014/0223174 A1* | 8/2014 | Krishnamurthy | H04L 63/0823 713/158 |
| 2015/0254677 A1* | 9/2015 | Huxham | G06K 19/0709 705/57 |
| 2015/0264566 A1* | 9/2015 | Melia | H04W 12/06 455/410 |

OTHER PUBLICATIONS

Intel, "Intel® Identity Protection Technology (Intel® IPT)", retrieved on Nov. 25, 2013, pp. 1-2. Available at http://www.intel.com/content/www/us/ en/architecture-and-technology/identity-protection.

PCworld, "TheftGuard Protects Notebook Data", retrieved on Nov. 4, 2013, pp. 1-2. Available at http://www.pcworld.com/article/110883/ article.html.

Wikipedia, the free encyclopedia, "4G", retrieved on Nov. 4, 2013, pp. 1-22. Available at http://en.wikipedia.org/wiki/4G.

Wikipedia, the free encyclopedia, "Mesh Networking", retrieved on Nov. 4, 2013, pp. 1-8. Available at http://en.wikipedia.org/wiki/Mesh networking.

Wikipedia, the free encyclopedia, "OnStar", retrieved on Nov. 25, 2014, pp. 1-6. Available at http://en.wikipedia.org/wiki/On_star.

Wikipedia, the free encyclopedia, "Software Communications Architecture", retrieved on Nov. 4, 2013, pp. 1-4. Available at http://en.wikipedia.org/wiki/Software Communications_Architecture.

Wikipedia, the free encyclopedia, "Software-Defined Radio", retrieved on Nov. 4, 2013, pp. 1-7. Available at http://en.wikipedia.org/wiki/Software-defined_radio.

* cited by examiner

METHODS AND APPARATUS FOR PAIRING ITEMS FOR SECURITY

TECHNICAL FIELD

Embodiments described herein generally relate to data processing and in particular to methods and apparatus for pairing items for security.

BACKGROUND

The need for security is a basic human need. Theft of physical belongings is among the events that cause people to feel insecure. The risk of becoming the victim of theft is not insignificant. According to the *Uniform Crime Report: Crime in the United States*, 2010 (available on the website for the Federal Bureau of Investigation (FBI) at www.fbi.gov/about-us/cjis/ucr/crime-in-the-u.s/2010/crime-in-the-u.s.-2010/property-crime/larcenytheftmain.pdf):

"In 2010, there were an estimated 6,185,867 larceny-thefts nationwide."

"The average value of property taken during larceny-thefts was $988 per offense."

"[T]he loss to victims nationally was over $6.1 billion." Typically, local police are responsible for enforcing laws against theft, but the local law enforcement organizations are frequently incapable of effectively dealing with the volume of these cases.

Consequently, thefts cost a fortune to humanity worldwide, including the costs for providing trained police forces, court systems, and jail systems, as well as the cost of the goods the police are not able to retrieve and return to the rightful owners.

Today the problem of theft is sometime handled through the use of serial numbers. For instance, the owner of a car may use a serial number or vehicle identification number (VIN) for the car to register with a state department of motor vehicles as the owner of the car. Or the owner of a personal computer (PC) may use a serial number for the PC to register with the manufacturer of the PC as the owner of the PC. However, such a registration process is passive and easy to circumvent or overlook. For instance, it may also be easy for a thief to eliminate an item's serial number. Consequently, serial numbers can be hard to track, and stolen items may be hard to locate, recover, ad return to the rightful owners.

What is needed is a more effective way to connect a person with the item's owned by that person. As described in greater detail below, this disclosure introduces methods and apparatus which use electronic pairing of items to provide greater security for those items.

DESCRIPTION OF EMBODIMENTS

As explained below, for purposes of illustration, the present disclosure describes one or more example embodiments. However, the present teachings are not limited to those particular embodiments.

An assembly of components includes two or more electronic devices firmly affixed to, or embedded in, different components of the assembly. Those electronic devices are used to pair components of the assembly with other components of the assembly, or with the assembly as a whole. Assemblies and their components may also be referred to as items.

A paired security application (PSA) includes data that pairs items with owners. The PSA also includes modules to track, monitor, revoke and replace items. Items may use a wide area network (WAN) such as the Internet to send updates to the PSA. Owners may use a WAN such as the Internet to interact with the PSA. And the PSA may use a WAN such as the Internet to interact with the owners. Thus, the PSA may operate as a cloud service. The PSA and the electronic devices which provide for such pairings, communications, etc., may be referred to collectively as a distributed security system. The security system and the items protected by that security system may be referred to collectively as an Internet of things.

In one example, a person purchases a car composed of many parts. Some of the parts are highly popular with thieves, due to the price of those parts. Some of the more removable and expensive parts include a small integrated circuit (IC) containing a small processor, memory, an operating system (OS), and cryptographically protected storage (or "crypto store"). An IC with some or all of those features may be referred to as a system ownership chip (SOC). The SOC also includes a software layer to handle the lifecycle for security keys and to handle connectivity and reporting back to a cloud service. The software layer also provides services that can exchange information regarding the identity of the car and the parts. A remote PSA is configured with data that pairs the purchased car to the owner and pairs the parts to the car; so the car belongs to the owner, and the car parts belongs to the car.

Every car that is manufactured may have a master SOC with a unique identity, and many parts may also have SOCs that will be able to exchange identity with the master SOC and with the PSA. Consequently, the SOCs will enable the components to be paired with the car itself.

When the owner purchases the car at the dealership, the dealer will provision a master car identity into the master SOC. In addition, the dealer and/or the purchase will provision the PSA with the identity of the car and the identity of the buyer, with data to electronically assign the car to the new owner. Thus, now that the car belongs to the buyer, the identity of the car is assigned to the buyer.

The location of the car parts are also associated with the car itself, with specific policies (e.g., this part should not be separated from this car by a distance of more than 50 yards). The master SOC and the PSA then monitor the car and its parts. For instance, the master SOC and/or the PSA may monitor whether the car contains all its original parts.

Subsequently, when the car is serviced, a part can be removed but it will need to be revoked from the system to prevent the security system from triggering an alarm. The PSA allows the owner to perform such revocations via the Internet. And the PSA prevents anyone except the registered owner from revoking an old part and associating a new part with the car.

Once the master SOC has been provisioned, it creates associations between the car and its parts. According to these associations, four wheels are paired with the car, and the car is paired with the car owner. This is a many-to-one-to-one (M:1:1) relationship between the parts of the car, the car itself, and the car owner, respectively. But in other embodiments or configurations, other relationships may be implemented, from 1:1:1 to M:M:M. For instance, the PSA may allow an owner to delegate ownership for a period of time or to add co-owners.

For example, the PSA and/or the master SOC may automatically monitor who is operating the car, and prevent anyone but authorized "owners" from using the car. Accordingly, an owner may add his or her child as a co-owner to allow the child to drive the car. But the owner may then revoke that privilege if the child is grounded. Consequently, the security system will prevent the car from starting if the child is trying to operate it.

The PSA and/or the master SOC can use any suitable techniques for determining who is trying to operate the car, including known authentication techniques based on attributes such as "who you are," "what you have," and "what you know." In addition, the PSA and/or the master SOC may require multi-factor authentication. Specific embodiments may include recognizing the user's smartphone, her fingerprint, her voice, her behavior, or other methods.

Figure 1:
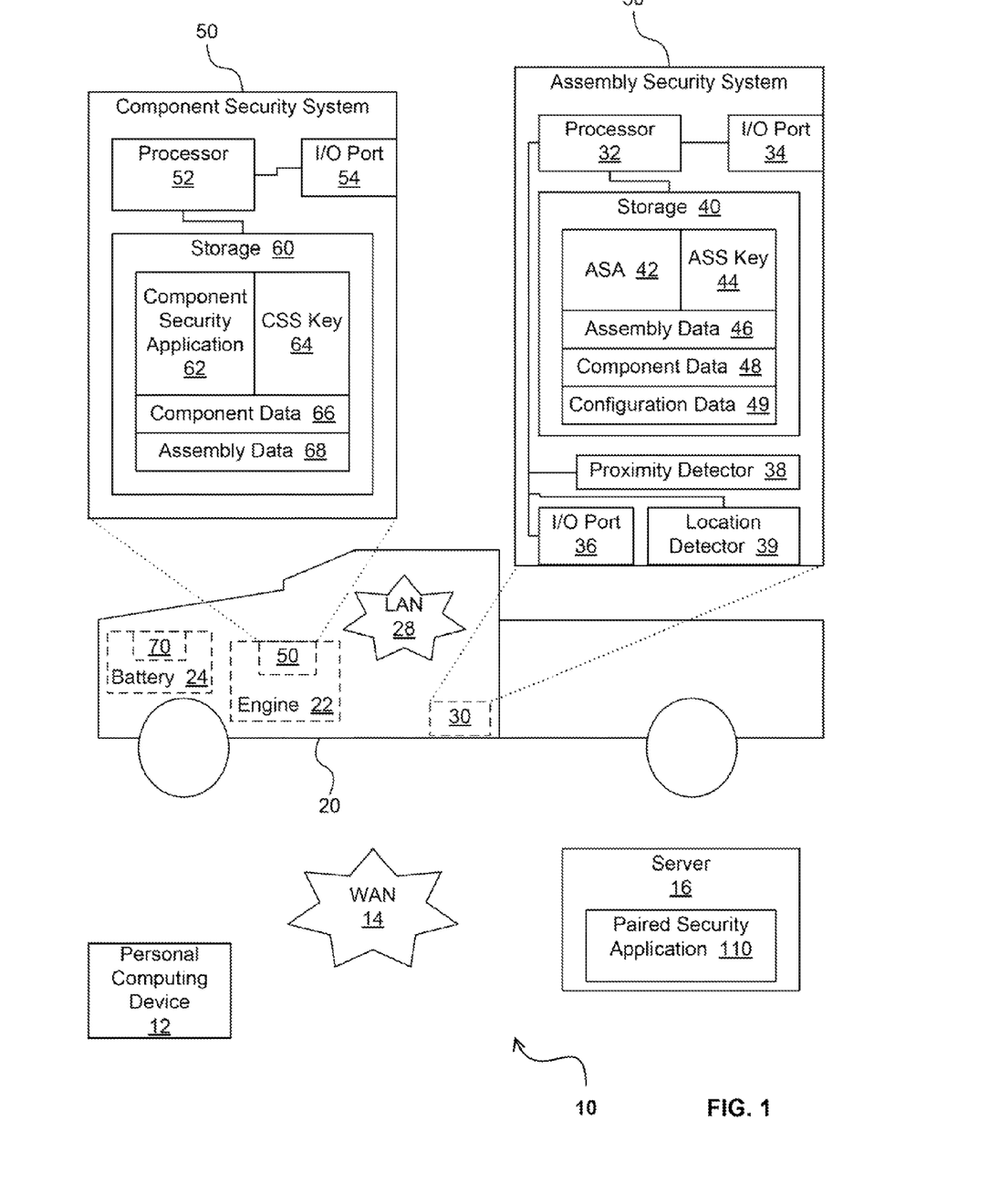
FIG. 1 is a block diagram of an example distributed security system that uses electronic pairing of items to provide greater security for those items.

FIG. 1 is a block diagram of an example distributed security system 10 that uses electronic pairing of items to provide greater security for those items. For example, security system 10 maintains associations between an owner and the owner's items and sub-items; and security system 10 provides for communications between items, sub-items, one or more central servers 16, and/or one or more personal computing devices 12.

For purposes of this disclosure, a sub-item is an item that is registered with another item as a component of that item. In other words, a master item or assembly (e.g., truck 20) may consist of a number of sub-items or components (e.g., engine 22 and battery 24). Thus, an item may be a master item or a sub-item; a master item may also be referred to as an assembly; and a sub-item may also be referred to as a component.

As shown in FIG. 1, truck 20 is equipped with an assembly security system 30, while engine 22 and battery 24 are equipped with respective component security systems 50 and 70. As described in greater detail below, assembly security system 30 and component security systems 50 and 70 are configured to communicate with each other, either directly or indirectly; and assembly security system is configured to communicate with server 16 and/or with personal computing device 12.

As shown in FIG. 1, assembly security system 30 includes a processor 32, storage 40, an input/output (I/O) port 36 for communicating with nearby components (such as engine 22), and an I/O port 34 for communicating with more remote devices (such as server 16). Similarly, component security system 50 includes a processor 52, storage 60, and an I/O port 54 for communicating with assembly security system 30. The I/O ports in assembly security system 30 and component security system 50 may be network ports, radio antennas, transmitters, receivers, and/or any other suitable communication substructure for communicating with other devices. The storage may be implemented as any suitable machine accessible data storage medium. The composition of component security system 70 may be the same or similar to that of component security system 50.

In addition, assembly security system 30 includes a proximity detector 38 and a location detector 39. In one embodiment, assembly security system 30 uses proximity detector 38 to determine how far each sub-item is from assembly security system 30. Assembly security system 30 uses location detector 39 to determine an absolute position of truck 20. Thus, truck 20 has a combination of proximity detection capabilities to detect proximity of paired items and absolute location capabilities so the truck's position can be reported and tracked. Any suitable technologies may be used to implement proximity detectors and location detectors. For instance, location detector 39 may be implemented using global positioning system (GPS) technology or Global Navigation Satellite System (GLONASS) technology, and proximity detector 38 may be implemented using short distance communication methods using technologies such as Bluetooth, Bluetooth low energy (LE), 802.11-based radio communications, and similar technologies. (Technologies based on Institute of Electrical and Electronics Engineers (IEEE) 802.11 standards may be referred to in general as "Wifi" technologies.) Other technologies may be used for location detectors and proximity detectors in other embodiments. For instance, location detectors that are capable of operating indoors to determine absolute location may be implemented using WiFi triangulation, Bluetooth LE exciters, passive radio-frequency identification (RFID) exciters and similar technologies. In addition, as described in greater detail below, assembly security system 30 may determine that a sub-item is beyond the approved proximity based on disappearance of that sub-item's heartbeat. Furthermore, in case a thief disables the master logic or the reporting capabilities of assembly security system 30, a remote monitoring service (such as paired security application 110) may conclude that truck 20 has been stolen based on failure to receive a heartbeat from assembly security system 30 for a period of time that equals or exceeds a predetermined threshold for allowable silence, in terms of time, in terms of the number of missing heartbeats, or in terms of any other suitable measurement.

In addition or alternatively, sub-items may include proximity detectors and/or location detectors, and sub-items may send location data to a main item. The main item may use the location data for the main item and the location data for the sub-items to determine proximity of the sub-items, relative to the main item. In addition or alternatively, a sub-item may use its proximity detector to detect proximity of itself and/or other sub-items to the main item. Sub-items may also include WAN capabilities, and a stolen sub-item may be able to report its location to server 22, for tracking purposes.

Assembly security system 30, component security system 50, and component security system 70 may each be implemented as one or more SOCs. An SOC may be embedded in or otherwise firmly or permanently affixed to an item. SOCs may be implemented using any suitable technology. For instance, component security system 70 on battery 24 may be implemented as a passive RFID tag. Component security system 50 and assembly security system 30 may be implemented using any suitable data processing platform having suitable compute capabilities, storage capabilities, communications capabilities, and identity and/or security capabilities. SOCs may obtain power from an on-board battery, from a power line of the assembly, by collecting energy from the interrogating electromagnetic (EM) field, or from any other suitable source.

An SOC may run a small hardened OS with the ability to connect to the Internet, either directly or indirectly. For instance, in the embodiment of FIG. 1, component security systems 50 and 70 do not have the autonomous ability to use wide area network communications, but instead create a local area network 28 (e.g., a personal area network (PAN) and/or a mesh network) with at least one other component (e.g., with assembly security system 30) that acts as a backbone. The backbone component connects with a WAN 14, such as the Internet. Thus component security systems 50 and 70 may connect to the Internet indirectly, via assembly security system 30. For purposes of this disclosure, communications between sub-items and between main items and sub-items may be referred to as internal communications; while communications between a main item (or a sub-item) and a remote processing device (such as server 16 or personal computing device 12) may be referred to as uplink or external communications.

In the embodiment of FIG. 1, LAN 28 is mesh network that supports wireless and/or wired connections. Component security system 70, component security system 50, and assembly security system 30 operate as nodes. Component security system 50 serves as a relay for communications between component security system 70 and assembly security system 30. And assembly security system 30 communicates with remote devices over WAN 14 on behalf of component security system 50 and component security system 70. In the embodiment of FIG. 1, WAN 14 is a wireless WAN (WWAN) that uses cellular communications technology.

However, in various embodiments, any suitable types of transport and higher level communications protocols may be used by the main items and the sub-items for internal and external communications. For instance, a main item and sub-items may communicate with each other using wired and/or wireless technologies based on Wifi, Bluetooth, ANT+, near field communication (NFC), Ethernet, low power Open Wireless Architecture (OWA), and/or other technologies. Items may communicate with remote servers and/or clients using various cellular standards (e.g., Long Term Evolution (LTE), general packet radio service (GPRS), High-Speed Downlink Packet Access (HSDPA), etc.), WWAN, WiFi, and/or others. In addition or alternatively, items may use Internet Protocol (IP) and/or other level 3 (L3) protocols, with User Datagram Protocol/Transmission Control Protocol (UDP)/(TCP) and/or other protocols. In addition or alternatively, items may use any suitable level 7 (L7) technologies, including without limitation MQ Telemetry Transport (MQTT), Simple Network Management Protocol (SMNP), etc. In addition or alternatively, embodiments may use WiFi for internal communications and wireless mesh for the uplink.

In the embodiment of FIG. 1, a component security application (CSA) 62 in component security system 50 cryptographically protects some or all of storage 60, including a portion holding one or more component security system (CSS) keys 64, a portion containing component data 66 pertaining to engine 22 and/or battery 24, and a portion containing assembly data 68 pertaining to assembly security system 30. Similarly, an assembly security application (ASA) 42 in assembly security system 30 cryptographically protects some or all of storage 40, including a portion holding one or more assembly security system (ASS) keys 44, a portion containing component data 48 pertaining to engine 22 and/or battery 24, a portion containing assembly data 46 pertaining to assembly security system 30, and a portion containing configuration data 49 for assembly security system.

In one embodiment, each master item has a unique serial number or identification number, and that number is recorded in the assembly security system as item identity data for that item. For instance, ASA 42 may save the VIN of truck 20 as part of assembly data 46. Furthermore, configuration data 49 in assembly security system 30 may specify parameters for various security functions. For instance, configuration data 49 may specify a maximum distance or proximity zone (e.g., twenty feet) beyond which each sub-item will be considered stolen. As described in greater detail below, owners may use a pairing security application (PSA) 110 in server 16 to record ownership of items, and to configure related security features. PSA 110 may also be referred to as a central security system.

The data in component security system 50, assembly security system 30, and/or server 16 that identifies components as paired with an assembly may be referred to as component relationship data. The data in component security system 50, assembly security system 30, and/or server 16 that identifies an assembly as paired with an owner may be referred to as assembly relationship data or owner relationship data. The data in component security system 50, assembly security system 30, and/or server 16 that defines a predetermined proximity zone may be referred to as a proximity setting. The data in component security system 50, assembly security system 30, and/or server 16 that defines a predetermined approved location may be referred to as a location setting.

Figure 2:
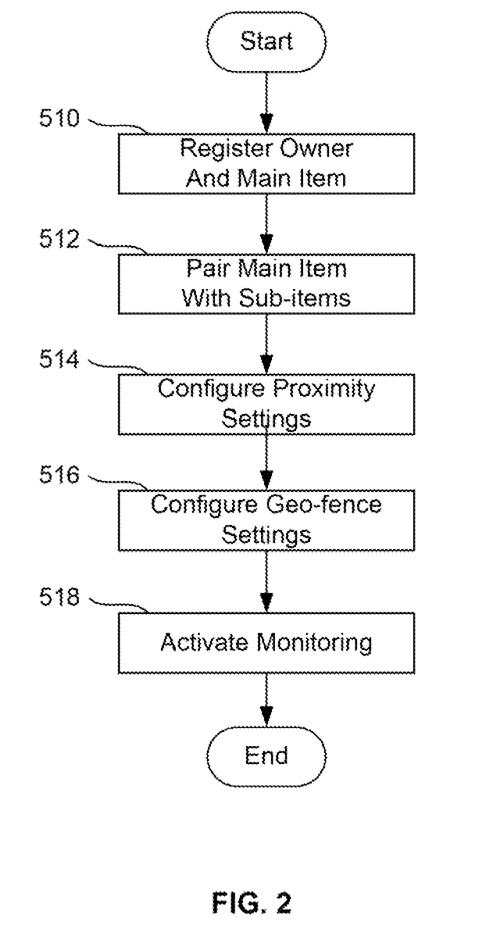
FIG. 2 is a flowchart of an example process for configuring the security system of FIG. 1.

FIG. 2 is a flowchart of an example process for configuring security system 10. That process starts at block 510 with the dealer updating assembly security system 30 and/or PSA 110 to register the buyer of truck 20 as the owner.

Figure 3:
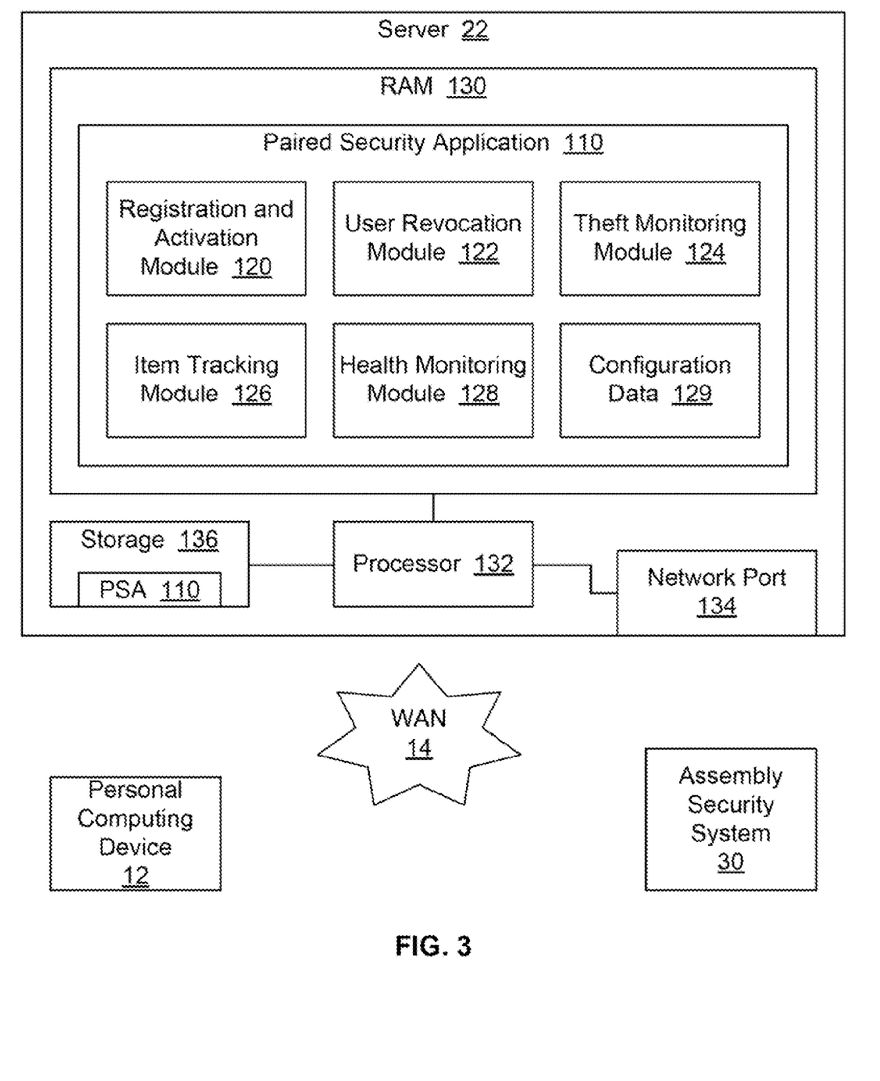
FIG. 3 is a block diagram highlighting some of the security features provided by the security system of FIG. 1.

FIG. 3 is a block diagram highlighting some of the security features provided by security system 10. In one embodiment, PSA 110 provides cloud services for personal computing device 12, assembly security system 30, component security system 50, and component security system 70. In other embodiments, the same or similar kinds of services may be provided using other approaches.

As shown in FIG. 3, server 22 includes a processor 132 coupled to a network port 134, storage 136, and random access memory (RAM) 130. PSA 110 may be stored in storage 136, and server 22 may copy some or all of PSA 110 to RAM 130 for execution. PSA 110 may include a registration and activation module 120, a user revocation module 122, a theft monitoring module 124, and item tracking module 126, and a health monitoring module 128.

Referring again to FIG. 2, as shown at block 510, when the buyer purchases truck 20, the dealer uses registration and activation module 120 to register the buyer of truck 20 as the owner. Alternatively, when an owner acquires an item, the owner may handle registration.

As shown at block 520, the sub-items may then register with the main item to establish pairings between each sub-item and the main item. Furthermore, some of all of those communications may be secure. For instance, the security systems may use pre-shared keys (PSKs) as an identification mechanism for communications between the master item and the sub-items. Those PSKs may be based on the CSS and ASS keys.

In one embodiment, after the seller provisions the master SOC using the buyer identity as the owner, the seller or the buyer may trigger a pairing process during which the master SOC and the slave components or sub-items (e.g., component security systems 50 and 70) establish relationships with each other, either directly or indirectly (e.g., hierarchically). Once those pairing relationships have been established, the sub-items may automatically send periodic heartbeat messages to the master item, and the master item may automatically send periodic heartbeat messages to a remote monitoring service. In addition or alternatively, when a new component in installed in the assembly, an approved person (e.g., the seller or the buyer) may start a pairing action between the new component and the existing master item or "parent" item. The new sub-item or "child" may then become a controlled and/or monitored entity of the parent, and may establish reporting/heartbeat relations to that parent, to siblings, and/or to remote entities, as directed by the master. For example, if the owner of truck 20 gets an installer to install a stereo in truck 20, the stereo may be provisioned to the master SOC by the seller, at which time the stereo will become a slave or child of the master SOC, reporting its existence (heartbeat) and proximity to the master SOC. Should the stereo's reported or sensed proximity change or disappear altogether, the master SOC may conclude that the stereo has been stolen. Also, after the seller provisions the master SOC using the buyer identity as the owner, the buyer can include other persons in the ownership.

ASA 42 and CSA 62 provide a layer of security to handle credentials and the identity lifecycle. For example, ASA 42 and CSA 62 may use ASS key 44 and CSS key 64 as bases for exchanging keys to identify and validate each other. ASA 42 and CSA 62 may also use ASS key 44 and CSS key 64 to establish a secure channel for some or all communications. ASA 42 may also use ASS key 44 to communicate securely with server 16. Thus, keys are used to establish communications security, and also to sign messages, to provide attestation of the source of such messages. For example a component reporting some information will sign such information to prove that the information actually came from that source.

Referring again to FIG. 1, once the security systems for the main item and the sub-items have been configured, assembly security system 30 will include component data 48 that identifies each of the sub-items that have been registered or paired with assembly security system 30. Similarly, the assembly data 68 in component security system 50 (and similar assembly data in component security system 70) identifies assembly security system 30 as the main item or backbone security system that is paired with engine 22 (and with battery 24).

In addition, the owner may also use registration and activation module 120 to set various security parameters for truck 20. Security system 10 may save configuration data 129 in PSA 110 and configuration data 49 in assembly security system 30, based on those parameters. For example, configuration data 49 and/or configuration data 129 may define a rule set to govern local notification (e.g., by using a horn in truck 20 to sound an alarm) as well as remote notification (e.g., via server 112 to personal computing device 12) on loss of proximity or removal from a geo-fence perimeter.

For example, as shown at block 514, the owner may set proximity parameters to define maximum permissible distances between assembly security system 30 and various sub-items, such as engine 22 and battery 24. If assembly security system 30 subsequently determines that a sub-item has left the approved zone of proximity, assembly security system 30 may send data to PSA 110 which causes theft monitoring module 124 to trigger an alarm and/or other types of notification, as described in greater detail below. As shown at block 516, the owner may also set one or more geo-fence perimeters for truck 20. Each geo-fence perimeter may define an allowed area or a prohibited area for truck 20. If assembly security system 30 or item tracking module 128 determines that truck 20 has left an approved area or entered a prohibited area, theft monitoring module 124 may trigger an alarm and/or other types of notification.

As shown at block 518, the owner may use registration and activation module 120 to activate security monitoring services for truck 20 and its paired sub-items.

Health monitoring module 128 automatically monitors the operational status of the paired items. For example, component security system 50 may send or push data on a regular basis to assembly security system 30. That data may be referred to as a heartbeat or a health check, and that heartbeat may securely identify engine 22 to assembly security system 30. For instance, the security systems may use respective keys to encrypt the heartbeat, the heartbeat may include checksums, etc. In addition or alternatively, an item may pull heartbeat or health check data from a sub-item. For instance, component security system 50 may periodically read an RFID tag for component security system 70 on battery 24, and component security system 50 may periodically relay that heartbeat back to assembly security system 30, along with heartbeat data for engine 22.

Figure 4:
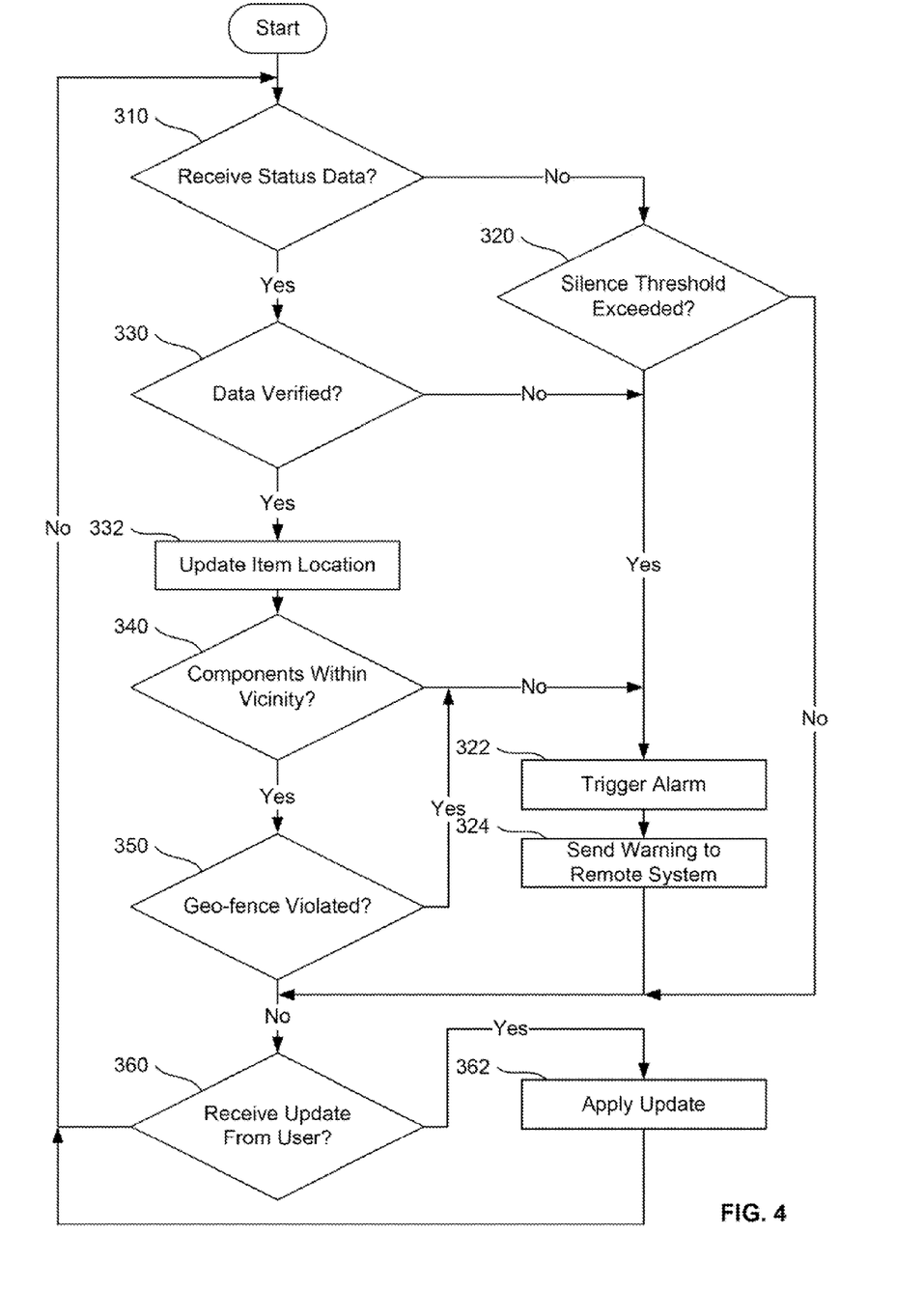
FIG. 4 is a flowchart of an example process for using the security system of FIG. 1.

FIG. 4 is a flowchart of an example process for using security system 10. The process of FIG. 4 begins after engine 22 and battery 24 have been paired with assembly security system 30 in truck 20, after the dealer has registered the buyer of truck 20 as the owner with PSA 110, and after the owner has configured PSA 110 with the desired security parameters. Subsequently, assembly security system 30 may periodically push health check data to health monitoring module 128, and/or health monitoring module 128 may periodically pull health check data from assembly security system 30. Health check data may also be referred to as status data or as a heartbeat. Accordingly, as shown at block 310, health monitoring module 128 may determine whether it PSA 110 has received any heartbeats from assembly security system 30. If a heartbeat has been received, health monitoring module 128 may then verify that the received data can be trusted, as shown at block 330. For instance, PSA 110 may require the data to be sent via a secure channel, based on a PSK, based on ASS key 44. In addition, the status data that PSA 110 receives from assembly security system 30 may be based on status data that assembly security system 30 has received as heartbeats from component security systems for components of truck 20 such as engine 22 and battery 24. And assembly security system 30 may likewise verify the authenticity of those heartbeats.

As shown at block 332, item tracking module 126 may then update the last known location of truck 20 (and/or components associated with truck 20), based on the heartbeats. Thus, item tracking module 126 automatically tracks the absolute location of main items and possibly sub-items. Consequently, as described in greater detail below, once an item has been stolen, PSA 110 may use item tracking module 126 to determine the present location of an item, or the last known location; and PSA 110 may report that location to the owner and/or to a third party, such as the local police.

As shown at block 340, based on the verified heartbeats, theft monitoring module 124 may determine whether engine 22 and battery 24 are still present within the predefined vicinity. Thus, theft monitoring module 124 may automatically determine whether an item has been stolen. Also, as shown at block 350, if the components are still within the vicinity, theft monitoring module 124 may determine whether truck 20 has violated any geo-fence restrictions. As shown at block 322, if any vicinity or geo-fence violations have been detected, theft monitoring module 124 may then send data to assembly security system 30 that triggers an audible and/or visible alarm in truck 20, or ASA 42 may automatically trigger the alarm. In addition, as shown at block 324, theft monitoring module 124 may send a warning to the owner via personal computing device 12. In addition or alternatively, theft monitoring module 124 may send a warning to another interested party (e.g., the police) via a processing device associated with that party. Theft warnings may be sent via any suitable mechanism (e.g., via email, text message, etc.).

In addition, the owner may utilize user revocation module 122 to manually report the theft of an item. Theft monitoring module 124 may then respond accordingly, triggering an alarm and/or sending theft warnings, as indicated above.

However, referring again to block 310, if a heartbeat has not been received, theft monitoring module 124 may determine whether a predetermined silence threshold has been met or exceeded, as shown at block 320. For instance, heartbeats from assembly security system 30 may have been disabled by a thief. If the threshold has been met or exceeded, theft monitoring module 124 may trigger an alarm and send a warning to a remote system, as shown at blocks 322 and 324 and described above. Similarly, assembly security system 30 may trigger local alarms and remote warnings in response to missing heartbeats from components of truck 20.

As shown at block 360, PSA 110 may then determine whether the owner has provided any configuration setting updates. If an update has been received, registration and activation module 120 may apply the update by changing configuration data 129 and/or configuration data 49, as shown at block 362. For instance, the owner may modify which items are registered to the owner. For example, if the owner obtains a replacement battery for truck 20, the owner may use registration and activation module 120 to instruct assembly security system 30 to pair with the new battery instead of the old one. Similarly, if the owner sells truck 20 to a new owner, the old owner may use registration and activation module 120 to unregister as the owner of truck 20 and to transfer registration to the new owner. (Alternatively, the buyer may register himself as the new owner.)

The process may then return to block 310, with PSA 110 continuing to monitor heartbeats, as indicated above.

In addition, heartbeats may indicate whether or not an item is malfunctioning or broken. For example, the heartbeat from battery 24 to assembly security system 30 (via engine 22) may indicate that the voltage of battery 24 is below a predetermined level, and the corresponding heartbeat from assembly security system 30 may relay that information to PSA 110. Similarly, assembly security system 30 may conclude that a component has malfunctioned, based on the absence of a heartbeat from that component.

Furthermore, some or all of the operations that are performed by components of PSA 110 in the embodiment of FIG. 4 may, in other embodiments, be performed by the same or similar components in ASA 42 and/or by other devices.

Thus, as has been described, PSA 110 may provide a cloud service with alerting capabilities that can automatically notify the owner of an item (and/or the local law enforcement agency) upon theft of the item. In addition or alternatively, alerts may be manually triggered by the owner of the item, as indicated above, or by the local law enforcement agency. In addition, PSA 110 and assembly security system 30 may enable an authorized user (e.g., the owner) to remotely disable truck 20 or one or more components of truck 20. In addition, sub-items may be configured to monitor heartbeats from the master item, and one or more sub-items may be configured to automatically disable itself in response to determining that a threshold of allowable silence has been exceeded since the last time the sub-item has received a heartbeat from the master item. Thus, a stereo may automatically disable itself if it is removed from the vicinity of a car for more than five minutes, for example. PSA 110 may provide an interface which allows the owner to release disabled items.

An advantage of one embodiment is that the disclosed technology can automatically notify an owner (and/or another interested party) if an item is stolen, based on the absolute location of the item or based on the proximity of that item to another item. Another advantage is that the disclosed technology can provide a central service for owners to monitor multiple items.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a system for securing possessions. The system comprises an item of value comprising an assembly of parts. The parts comprise a component that has value independent of the item, and an assembly security system that is operable to communicate with a central security system via a wide area network. The component comprises a component security system that is operable to communicate with the assembly security system. The assembly security system is operable to perform operations comprising: (a) saving component data that identifies the component as part of the item; (b) after saving the component data, monitoring the component, via the component security system, to automatically determine whether the component has left a predetermined zone of proximity, relative to the item; and (c) in response to determining that the component has left the predetermined zone of proximity, automatically notifying the central security system that the component has left the predetermined zone of proximity.

Example A2 includes the features of Example A1, and the assembly security system comprises a proximity detector operable to determine proximity of the component, relative to the assembly security system.

Example A3 includes the features of Example A1 and the central security system. The central security system comprises (a) owner identity data that identifies an owner of the item, and (b) owner relationship data that links the item with the owner. The central security system is operable to automatically notify the owner in response to receiving notification that the component is missing. Example A3 may also include the features of Example A2.

Example A4 includes the features of Example A1 and the central security system. The central security system is operable to automatically trigger a notification in response to a lack of communication from the item of value for a period of time in excess of a predetermined threshold for allowable silence. Example A4 may also include the features of any one or more of Examples A2 through A3.

Example A5 includes the features of Example A1. Also, the item comprises a location detector, and the assembly security system is operable to automatically provide the central security system with location data for the item, based on location data from the location detector. Example A5 may also include the features of any one or more of Examples A2 through A4.

Example A6 includes the features of Example A5 and the central security system. The central security system includes (a) owner identity data that identifies an owner of the item and (b) owner relationship data that links the item with the owner. The central security system is operable to determine whether the item has violated predetermined location restrictions for the item, based on the location data for the item from the assembly security system. The central security system is also operable to automatically notify the owner in response to determining that the item has violated the predetermined location restrictions. Example A6 may also include the features of any one or more of Examples A2 through A4.

Example A7 includes the features of Example A1. Also, the component security system comprises cryptographically protected storage operable to securely store one or more keys for the component. The component security system is operable to conduct secure communications with the assembly security system, with the secure communications based on at least one of the keys for the component. Example A7 may also include the features of any one or more of Examples A2 through A6.

Example A8 includes the features of Example A1. Also, the assembly security system comprises cryptographically protected storage operable to securely store one or more keys for the item. The assembly security system is operable to conduct secure communications with the component security system, with the secure communications based on at least one of the keys for the item. Example A8 may also include the features of any one or more of Examples A2 through A7.

Example A9 includes the features of Example A1. Also, the assembly security system comprises cryptographically protected storage operable to securely store one or more keys for the item. The assembly security system is operable to conduct secure communications with the remote security system, with the secure communications based on at least one of the keys for the item. Example A9 may also include the features of any one or more of Examples A2 through A8.

Example A10 includes the features of Example A1. Also, the component security system and the assembly security system are operable to attest to authenticity of communications between the component security system and the assembly security system. The assembly security system is also operable to attest to authenticity of communications from the assembly security system to the central security system. Example A10 may also include the features of any one or more of Examples A2 through A9.

Example A11 includes the features of Example A1. Also, the assembly security system comprises item identity data that uniquely identifies the item of value. The assembly security system is operable to use the item identity data to identify the assembly security system with the central security system. Example A11 may also include the features of any one or more of Examples A2 through A10.

Example A12 includes the features of Example A1. Also, the component security system comprises component identity data that identifies the component. The component data in the assembly security system is based at least in part on the component identity data from the component security system. Example A12 may also include the features of any one or more of Examples A2 through A11.

Example A13 includes the features of Example A1. Also, the assembly security system is operable to determine that the component has left the predetermined zone of proximity, based on a lack of communication from the component for a period of time in excess of a predetermined threshold for allowable silence. Example A13 may also include the features of any one or more of Examples A2 through A12.

Example A14 includes the features of Example A1. Also, the component is operable to automatically disable itself in response to a lack of communication from the assembly security system for a period of time in excess of a predetermined threshold for allowable silence. Example A14 may also include the features of any one or more of Examples A2 through A13.

Example B1 is a method for securing possessions. The method comprises (a) saving component data in an assembly security system of an item, wherein the item comprises an assembly of components, and wherein the component data identifies at least one of the components as part of the item; (b) saving a proximity parameter in the assembly security system, wherein the proximity parameter defines a required zone of proximity for the component, relative to the item; (c) at the assembly security system, receiving a heartbeat from the component; (d) automatically determining, based on the heartbeat, whether the component has left the required zone of proximity; and (e) in response to determining that the component has left the predetermined zone of proximity, automatically triggering an alarm.

Example B2 includes the features of Example B1. Also, the operation of automatically triggering an alarm comprises notifying a central security system, via a wide area network, that the component has left the predetermined zone of proximity.

Example B3 includes the features of Example B2. Also, in response to being notified that the component has left the predetermined zone of proximity, the central security system automatically notifies an owner of the item that the component has left the predetermined zone of proximity.

Example B4 includes the features of Example B2. Also, the central security system automatically triggers a notification in response to a lack of communication from the item of value for a period of time in excess of a predetermined threshold for allowable silence.

Example B5 includes the features of Example B1. Also, the component comprises a component security system. The method further comprises (a) saving a private key for the item in cryptographically protected storage of the assembly security system; and (b) saving a private key for the component in cryptographically protected storage of the component security system. Example B5 may also include the features of any one or more of Examples B2 through B4.

Example B6 includes the features of Example B5. Also, the operation of automatically triggering an alarm comprises (a) sending a message from the assembly security system to a central security system to indicate that the component has left the predetermined zone of proximity; and (b) before sending the message to the central security system, using the private key to encrypt the message. Example B6 may also include the features of any one or more of Examples B2 through B4.

Example B7 includes the features of Example B5. And the method further comprises, after receiving the heartbeat from the component at the assembly security system, using a public key counterpart for the private key of the component to decrypt the heartbeat. Example B7 may also include the features of any one or more of Examples B2 through B4 and B6.

Example B8 includes the features of Example B1. And the method further comprises (a) at the assembly security system, receiving, from a central security system, a message with a security update from an owner of the item; (b) at the assembly security system, using a public key associated with the central security system to decrypt the message; and (c) after decrypting the message, updating a security parameter in the assembly security system, based on the decrypted message, in accordance with the security update. Example B8 may also include the features of any one or more of Examples B2 through B7.

Example B9 includes the features of Example B1. Also, the component security system and the assembly security system attest to authenticity of communications between the component security system and the assembly security system. The assembly security system also attests to authenticity of communications from the assembly security system to the central security system. Example B9 may also include the features of any one or more of Examples B2 through B8.

Example B10 includes the features of Example B1. Also, the assembly security system comprises a location detector, and the method further comprises (a) automatically using the location detector to determine whether the item has left a predefined approved area; and (b) in response to determining that the item has left the predefined approved area, automatically notifying a central security system that the item has left the predefined approved area. Example B10 may also include the features of any one or more of Examples B2 through B9.

Example B11 includes the features of Example B10. Also, in response to being notified that the item has left the predefined approved area, the central security system automatically notifies an owner of the item that the item has left the predefined approved area. Example B11 may also include the features of any one or more of Examples B2 through B9.

Example B12 includes the features of Example B10. And the method further comprises (a) configuring the central security system to link the item with multiple owners; and (b) preventing the item from being operated by a user if the user has not been registered as one of the owners. Example B12 may also include the features of any one or more of Examples B2 through B9 and B11.

Example B13 includes the features of Example B1. Also, the operation of automatically triggering an alarm comprises automatically notifying a law enforcement organization that the component has left the predetermined zone of proximity. Example B13 may also include the features of any one or more of Examples B2 through B12.

Example B14 includes the features of Example B1. Also, the assembly security system determines that the component has left the predetermined zone of proximity, based on a lack of communication from the component for a period of time in excess of a predetermined threshold for allowable silence. Example B14 may also include the features of any one or more of Examples B2 through B13.

Example B15 includes the features of Example B1. Also, the component automatically disables itself in response to a lack of communication from the assembly security system for a period of time in excess of a predetermined threshold for allowable silence. Example B15 may also include the features of any one or more of Examples B2 through B14.

Example C is at least one machine accessible medium comprising computer instructions for securing a possession. The computer instructions, in response to being executed on a data processing system, enable the data processing system to perform a method according to any one or more of Examples B1 through B15.

Example D is a data processing system that helps to secure a possession. The data processing system comprises a processing element, at least one machine accessible medium responsive to the processing element, and computer instructions stored at least partially in the at least one machine accessible medium. Also, in response to being executed, the computer instructions enable the data processing system to perform a method according to any one or more of Examples B1 through B15.

Example E is a data processing system that helps to secure a possession. The data processing system comprises means for performing the method of any one or more of Examples B1 through B15.

Example F1 includes at least one machine accessible medium comprising computer instructions for securing a possession. The computer instructions, in response to being executed on a data processing system, enable the data processing system to perform operations comprising (a) saving component data in an assembly security system of an item, wherein the item comprises an assembly of components, and wherein the component data identifies at least one of the components as part of the item; (b) saving a proximity parameter in the assembly security system, wherein the proximity parameter defines a required zone of proximity for the component, relative to the item; (c) at the assembly security system, receiving a heartbeat from the component; (d) automatically determining, based on the heartbeat, whether the component has left the required zone of proximity; and (e) in response to determining that the component has left the predetermined zone of proximity, automatically triggering an alarm.

Example F2 includes the features of Example F1. Also, the operation of automatically triggering an alarm comprises sending a message to a central security system, via a wide area network, to notify the central security system that the component has left the predetermined zone of proximity.

Example F3 includes the features of Example F2, and the operations further comprise (a) saving a private key for the item in cryptographically protected storage of the assembly security system; and (b) before sending the message to the central security system, using the private key to encrypt the message.

Example F4 includes the features of Example F1, and the operation of receiving a heartbeat from the component comprises receiving the heartbeat from a component security system of the component. Also, the operations further comprise using a public key associated with the component security system to decrypt the heartbeat. Example F4 may also include the features of any one or more of Examples F2 through F3.

Example F5 includes the features of Example F1, and the operations further comprise (a) receiving, from a central security system, a message with a security update from an owner of the item; (b) using a public key associated with the central security system to decrypt the message; and (c) after decrypting the message, updating a security parameter in the assembly security system, based on the decrypted message, in accordance with the security update. Example F5 may also include the features of any one or more of Examples F2 through F4. Example F6 includes the features of Example F1, and the operations further comprise (a) automatically using a location detector for the assembly security system to determine whether the item has left a predefined approved area; and (b) in response to determining that the item has left the predefined approved area, automatically notifying a central security system that the item has left the predefined approved area. Example F6 may also include the features of any one or more of Examples F2 through F5.

Example F7 includes the features of Example F1, and the operations further comprise (a) automatically using a location detector for the assembly security system to determine whether the item has left a predefined approved area; and (b) in response to determining that the item has left the predefined approved area, automatically notifying an owner of the item that the item has left the predefined approved area. Example F7 may also include the features of any one or more of Examples F2 through F6.

Example F8 includes the features of Example F1, and the operations further comprise electronically preventing the item from being operated by a user if the user has not been registered as an owner of the item. Example F8 may also include the features of any one or more of Examples F2 through F7.

Example F9 includes the features of Example F1, and the operation of automatically triggering an alarm comprises automatically notifying a law enforcement organization that the component has left the predetermined zone of proximity. Example F9 may also include the features of any one or more of Examples F2 through F8.

What is claimed is:

1. A system for securing possessions, the system comprising:
   an item of value comprising an assembly of parts, wherein the parts comprise:
      a component that has value independent of the item; and
      an assembly security system that is operable to communicate with a central security system via a wide area network;
   wherein the component comprises a component security system that is operable to communicate with the assembly security system; and
   wherein the assembly security system is operable to perform operations comprising:
      saving component data that identifies the component as part of the item;
      after saving the component data, monitoring the component, via the component security system, to automatically determine whether the component has left a predetermined zone of proximity, relative to the item; and
      in response to determining that the component has left the predetermined zone of proximity, automatically notifying the central security system that the component has left the predetermined zone of proximity.

2. A system according to claim 1, wherein the assembly security system comprises a proximity detector operable to determine proximity of the component, relative to the assembly security system.

3. A system according to claim 1, further comprising:
   the central security system, wherein the central security system comprises:
      owner identity data that identifies an owner of the item; and
      owner relationship data that links the item with the owner; and
   wherein the central security system is operable to automatically notify the owner in response to receiving notification that the component is missing.

4. A system according to claim 1, further comprising:
   the central security system, wherein the central security system is operable to automatically trigger a notification in response to a lack of communication from the item of value for a period of time in excess of a predetermined threshold for allowable silence.

5. A system according to claim 1, wherein:
   the item comprises a location detector; and
   the assembly security system is operable to automatically provide the central security system with location data for the item, based on location data from the location detector.

6. A system according to claim 5, further comprising:
   the central security system;
   owner identity data in the central security system, wherein the owner identity data identifies an owner of the item; and
   owner relationship data in the central security system, wherein the owner relationship data links the item with the owner; and
   wherein the central security system is operable to perform operations comprising:
      determining whether the item has violated predetermined location restrictions for the item, based on the location data for the item from the assembly security system; and
      automatically notifying the owner in response to determining that the item has violated the predetermined location restrictions.

7. A method for securing possessions, the method comprising:
   saving component data in an assembly security system of an item, wherein the item comprises an assembly of components, and wherein the component data identifies at least one of the components as part of the item;
   saving a proximity parameter in the assembly security system, wherein the proximity parameter defines a required zone of proximity for the component, relative to the item;
   at the assembly security system, receiving a heartbeat from the component;
   automatically determining, based on the heartbeat, whether the component has left the required zone of proximity; and
   in response to determining that the component has left the predetermined zone of proximity, automatically triggering an alarm.

8. A method according to claim 7, wherein the operation of automatically triggering an alarm comprises:
   notifying a central security system, via a wide area network, that the component has left the predetermined zone of proximity.

9. A method according to claim 8, wherein:
   in response to being notified that the component has left the predetermined zone of proximity, the central security system automatically notifies an owner of the item that the component has left the predetermined zone of proximity.

10. A method according to claim 8, wherein:
    the central security system automatically triggers a notification in response to a lack of communication from the item of value for a period of time in excess of a predetermined threshold for allowable silence.

11. A method according to claim 7, wherein the component comprises a component security system, and the method further comprising:
    saving a private key for the item in cryptographically protected storage of the assembly security system; and
    saving a private key for the component in cryptographically protected storage of the component security system.

12. A method according to claim 11, wherein the operation of automatically triggering an alarm comprises:
    sending a message from the assembly security system to a central security system to indicate that the component has left the predetermined zone of proximity; and
    before sending the message to the central security system, using the private key to encrypt the message.

13. A method according to claim 11, further comprising:
    after receiving the heartbeat from the component at the assembly security system, using a public key counterpart for the private key of the component to decrypt the heartbeat.

14. A method according to claim 7, further comprising:
    at the assembly security system, receiving, from a central security system, a message with a security update from an owner of the item;
    at the assembly security system, using a public key associated with the central security system to decrypt the message; and after decrypting the message, updating a security parameter in the assembly security system, based on the decrypted message, in accordance with the security update.

15. A method according to claim 7, wherein:

the component security system and the assembly security system attest to authenticity of communications between the component security system and the assembly security system; and the assembly security system attests to authenticity of communications from the assembly security system to the central security system.

16. A method according to claim 7, wherein the assembly security system comprises a location detector, and the method further comprises:

automatically using the location detector to determine whether the item has left a predefined approved area; and in response to determining that the item has left the predefined approved area, automatically notifying a central security system that the item has left the predefined approved area.

17. A method according to claim 16, wherein:

in response to being notified that the item has left the predefined approved area, the central security system automatically notifies an owner of the item that the item has left the predefined approved area.

18. A method according to claim 16, further comprising:

configuring the central security system to link the item with multiple owners; and preventing the item from being operated by a user if the user has not been registered as one of the owners.

19. A method according to claim 7, wherein the operation of automatically triggering an alarm comprises:

automatically notifying a law enforcement organization that the component has left the predetermined zone of proximity.

20. A method according to claim 7, wherein the assembly security system determines that the component has left the predetermined zone of proximity, based on a lack of communication from the component for a period of time in excess of a predetermined threshold for allowable silence.

21. A method according to claim 7, wherein the component automatically disables itself in response to a lack of communication from the assembly security system for a period of time in excess of a predetermined threshold for allowable silence.

22. At least one non-transitory machine accessible medium comprising computer instructions for securing a possession, wherein the computer instructions, in response to being executed on a data processing system, enable the data processing system to perform operations comprising:

saving component data in an assembly security system of an item, wherein the item comprises an assembly of components, and wherein the component data identifies at least one of the components as part of the item;

saving a proximity parameter in the assembly security system, wherein the proximity parameter defines a required zone of proximity for the component, relative to the item;

at the assembly security system, receiving a heartbeat from the component;

automatically determining, based on the heartbeat, whether the component has left the required zone of proximity; and in response to determining that the component has left the predetermined zone of proximity, automatically triggering an alarm.

23. At least one non-transitory machine accessible medium according to claim 22, wherein the operations further comprise:

automatically using a location detector for the assembly security system to determine whether the item has left a predefined approved area; and in response to determining that the item has left the predefined approved area, automatically notifying a central security system that the item has left the predefined approved area.

24. At least one non-transitory machine accessible medium according to claim 22, wherein the operations further comprise:

electronically preventing the item from being operated by a user if the user has not been registered as an owner of the item.

* * * * *